Nov. 6, 1962          S. DILNOT          3,062,669
LIGHT WEIGHT AERATED CONCRETE
Filed Jan. 28, 1957
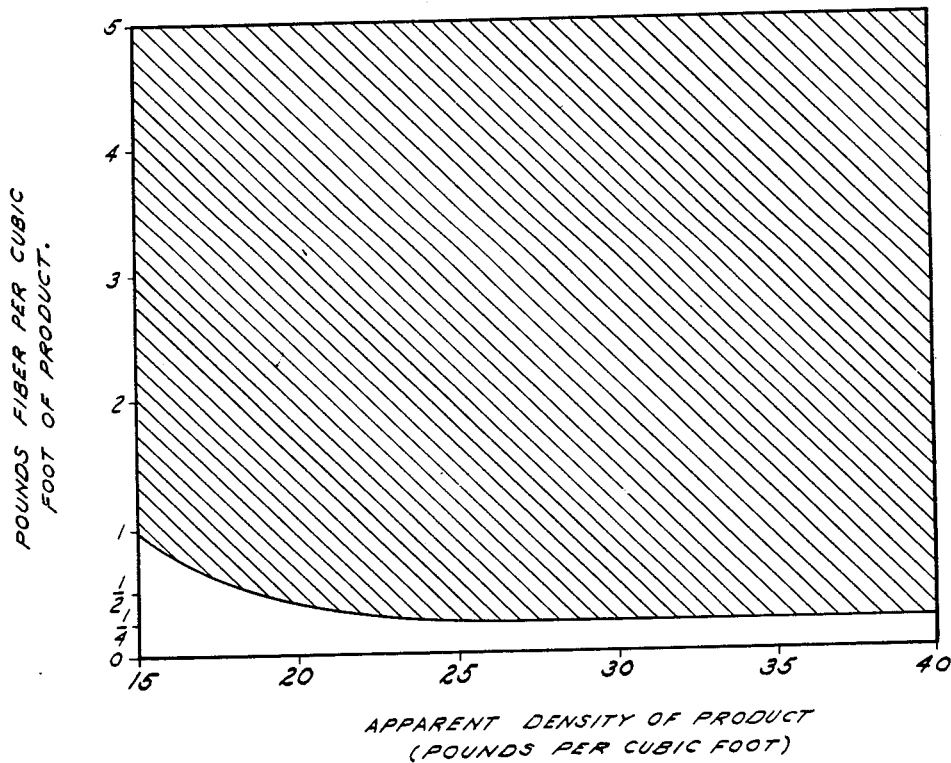
INVENTOR.
SIDNEY DILNOT
BY
Barnes, Kisselle, Laughlin & Raisch
ATTORNEYS United States Patent Office 3,062,669
Patented Nov. 6, 1962

3,062,669
LIGHT WEIGHT AERATED CONCRETE
Sidney Dilnot, Langley, Bucks, England
(36 Upton Court Road, Slough, Bucks, England)
Filed Jan. 28, 1957, Ser. No. 636,632
6 Claims. (Cl. 106—87)

This invention relates to aerated calcium silicate hydrate products and to a process for manufacturing such products. This application is a continuation-in-part of my co-pending application, Serial No. 331,745, filed January 16, 1953, now abandoned, and of my co-pending applications, Serial No. 409,967, filed February 12, 1954, now abandoned, and Serial No. 409,792, filed February 12, 1954.

It is well known that finely divided, calcareous and siliceous raw materials combine in the presence of water in an autoclave to produce strong calcium silicate hydrate products, the reaction being usually carried out at temperatures of the order of 300°–400° F. The chemical reaction between the calcareous and siliceous materials is essentially a surface reaction, taking place primarily at the surface of the siliceous components to produce calcium silicate hydrate, which bonds the larger siliceous particles together. By using a small amount of water in making the slurry, as in the manufacture of sand-lime bricks, a dense article is produced. It has been proposed to produce low density articles by using a large excess of water in making the slurry. In such method, the water acts as a spacer, and after autoclaving the slurry and drying, the article produced is traversed by a network of microscopic or capillary veins.

There are a number of disadvantages in this low density product and its process of manufacture. The capillary veins render the product moisture absorbent, and the product has a large coefficient of moisture expansion. Also, it is necessary to incorporate into the slurry stabilizers or thickeners to prevent settling or stratification of the ingredients, and such stabilizers adversely affect the properties of the final product. Further, the cost of drying is increased by reason of the large amount of uncombined water present in the autoclaved product.

It is an object of the present invention to produce calcium silicate hydrate bodies which exhibit good heat insulation in the atmospheric temperature range, and have relatively high rupture strength, and high compressive strength, and have low apparent density on the order of about 15 to 40 pounds per cubic foot.

A further object is the provision of low density calcium silicate hydrate bodies which exhibit good heat insulation in the atmospheric temperature range, are relatively fireproof, have relatively low water absorption, and are free from planes of weakness.

Other objects will be apparent from the following specification. The products of this invention are self-sustaining bodies of a dense calcium silicate hydrate matrix having distributed therein macroscopic spherical voids, and fibers at a distribution density of about .25 to 5 pounds per cubic foot of the body, the bodies having an apparent density on a dry basis of between about 15 to 40 pounds per cubic foot. The bodies are rigid, fire-resistant, have a high resistance to absorption of water and water vapor, a high thermal-insulating effectiveness, and freedom from cracks and planes of weakness. The lower density products, for example, about 15 to 30 pounds per cubic foot, may be used where they are not subject to severe mechanical stress, and the higher density products, for example, 30 to 40 pounds per cubic foot, can be used as structural or load bearing members.

The transverse strength of the product varies with the fiber content up to a maximum at about 4 to 5 pounds per cubic foot of product. Thus, for a typical product having a density of 31.5 pounds per cubic foot and a fiber content of less than one pound per cubic foot, the transverse strength varies from about 100 pounds per square inch for a fiber content of less than one pound per cubic foot, to about 450 pounds per square inch for a fiber content of about 2½ pounds per cubic foot, and to about 550 pounds per square inch with a fiber content of about 4 pounds per cubic foot. The preferred fiber content is between about one to 2½ pounds per cubic foot. The comprehensive strength may increase slightly with increase in fiber content.

I prefer strong fibers in which at least about 80 percent have a length between about .5 centimeter and about 2.5 centimeters and not more than about 10 percent are less than 3 millimeters in length. The individual fibers or clusters should not exceed about 1 millimeter in diameter. Fibers suitable for use in my compositions are long asbestos fibers and cellulosic fibers derived from various sources and include plant stem fibers and coniferous and broadleaf tree wood fibers. The stronger long fibers, such as bagasse and long aspen semi-chemical paper pulp fibers, are preferred. The resins and lignins which cause discoloration of the composition in the autoclaving step, usually are removed sufficiently in conventional digestion methods for making paper pulp by the semi-chemical process, so that long, strong fibers from such process may be used. However, where removal of resins or lignin from such fibers is inadequate, the fibers can be improved by soaking them in dilute caustic soda solution (one to two percent) for about 24 hours. I prefer to presoak the fibers in water, dilute caustic soda, or a dilute sodium silicate solution (about one percent) before their incorporation into the slurry. The sodium silicate improves the bond between the fibers and the calcium silicate hydrate matrix. The presoaking of the cellulose fibers apparently causes them to swell so that when the autoclaved product is dried, the cellulose fibers tend to shrink slightly but remain bonded to the matrix, and thus effect a "prestressing" action that improves the transverse strength.

In making products of higher density, e.g., 30 pounds per cubic foot or higher, it is desirable to incorporate relatively coarse fillers or aggregates, such as coarse silica sand and gravel. This filler is less expensive than the finely divided reactive calcareous and siliceous compounds and, therefore, reduces the cost of such higher density products.

The products of this invention are produced by forming a substantially uniform stable foamed aqueous slurry of finely ground, inorganic calcareous and siliceous materials, and long fibers, the amount of water being such that a stable slurry is obtained, and autoclaving the quiescent foamed slurry formed into the desired shape, under steam pressure to react the calcareous and siliceous materials to form the rigid calcium silicate hydrate matrix having dispersed therethrough the fibers and macroscopic spherical voids.

Reactive calcareous components, which can be employed in the process, are inorganic substances containing calcium oxide or other form of chemically combined calcium which, under the conditions employed in the presetting and/or indurating steps of the process, react with the siliceous components to form calcium silicate hydrates. Examples of reactive calcareous substances or components, which can be employed in making the calcium silicate hydrate product of the invention, include burnt lime, hydrated lime, Portland cement, lime-containing hydraulic and natural cements, and others, as well as mixtures thereof. The calcareous components should be finely divided and should have a specific surface area exceeding 2,000 square centimeters per gram.

Reactive siliceous components, which can be employed in the process, are inorganic substances containing silica or a substance which, under the conditions employed in the presetting and/or indurating step of the process, react with the calcareous components to form calcium silicate hydrates. Examples of reactive siliceous components or substances, which can be employed in making the calcium silicate hydrate product of the invention, include diatomaceous earth, sand, artificial or natural pozzuolanas, pulverized fuel ash (fly ash), ground silica, and others, as well as mixtures thereof. The reactive siliceous particles should ordinarily have a specific surface area exceeding 7,000 square centimeters per gram.

For optimum strength, the calcareous and siliceous components are balanced to give approximately equal amounts of reactive lime and reactive silica. Where optimum strength is not a prime consideration, an excess of the reactive siliceous components is used to avoid the formation of a product containing free lime. The relative proportions of the calcareous and siliceous components may vary rather widely, depending upon the nature of such components and the proportion of reactive materials therein. Ordinarily, the ratio of the weight of the siliceous components to the weight of the calcareous components will vary between about .4:1 and about 4:1. These ratios are merely illustrative and it will be apparent to those persons acquainted with this art that other ratios may be employed for producing a product having certain desired characteristics.

The term, "stable, preformed foam," as used in the description and claims herein, means an aqueous foam formed in advance of its mixture with the slurry and which is sufficiently stable to be incorporated into the slurry without substantial coalescence of the bubbles or break-down of the foam. The volume of the final foam, divided by the volume of the solution from which it was prepared, is frequently referred to as the "expansion factor" of the foam. Knowing the expansion factor of the foam and either the volume of foam used or the volume of the solution from which the foam was prepared, the volume of air or other gas introduced into a wet mixture of calcareous and siliceous components can be determined with considerable precision and that, because the foam remains stable when dispersed in the wet mixture, the ultimate apparent density of the dry calcium silicate hydrate product can be determined with considerably accuracy in advance of the curing step. Generally speaking, it is advisable to prepare the foam, using any convenient and conventional way, so that the individual gas bubbles are as small as possible.

Suitable foaming agents are available, and are familiar in the art, from which foams can be made having an expansion factor of from about 6, or less, to about 18, or more, and the invention contemplates the use of such expansion factors. Such foams may be formed by gassifying a dilute solution, for example, 1 to 4 percent of a foaming agent in water. A foam having an expansion factor of between about 9 and 13 can be used with complete satisfaction. It is pointed out, however, that the invention is not limited as to the specific foaming agent employed. Examples of suitable foaming agents, which can be employed, often with a stabilizer, include saponin, peptones, albumin, soap bark, water soluble cellulose ethers, hydrated cellulose dispersions, alkylnapthalene sulfonates, stabilized soaps, hydrolyzed proteins, and others, as well as mixtures thereof. Certain of the agents mentioned, e.g., hydrated cellulose dispersions, may often act principally as stabilizing agents for foams prepared by using one or more other agents. Other foam stabilizers, such as bentonite, may be added to enhance the stability of the foam.

Where the foam is generated by the addition of a gas-producing substance, such as aluminum powder, to the mix, or where the foam is generated by violent agitation or beating of a mix containing a foaming agent, it is difficult to measure or control the amount of gas in the mix, it is difficult to achieve foam stability, and it often requires special precautions in the mixing or casting techniques.

Asbestos and cellulose fibers are suitable for the practice of this invention, these fibers being characterized by the fact that they do not react to any significant degree with the calcareous and siliceous components, but retain their fibrous character in the dry product. Fibers which react with the siliceous and calcareous components and lose their fibrous character in the final product are not acceptable for the purposes of this invention. For this reason, mineral wool, glass fibers and similar fibers are not acceptable for the practice of this invention. The term, "mineral wool," as used above, does not include asbestos, but is intended to include other mineral fibers having the appearance of wool, such as those composed principally of silicates of calcium and aluminum, which lose their fibrous character in the final product.

The accompanying diagram is a co-ordinated diagram of fiber content versus density of the product, the permissible fiber content for a product of a given density lying within the shaded area of this diagram.

Very small amounts of fibers are adequate for all cases, a quantity as low as 1.0 pound of fiber per cubic foot of product on a dry basis being adequate for a product with as low an apparent density as 15 pounds per cubic foot, about 0.5 pound of fiber per cubic foot of product being adequate for a product with an apparent density of about 18–22 pounds per cubic foot, and about 0.25 pound of fiber per cubic foot of product being adequate for a product with an apparent density of about 27–40 pounds per cubic foot. The aforementioned quantities of fibers are minimums for the particular density of the product involved and additional, desirable properties may be imparted to the product by using additional fibrous material up to a maximum of about 5 pounds of fiber per cubic foot of product. In particular, the use of an additional quantity of fiber, over and above the minimum required for accommodating stresses and strains, will increase the machinability, nail-holding and similar properties of the product and, most importantly, will increase the transverse strength (modulus of rupture) of the product to a value not heretofore possible with products of this type. This increase in transverse strength is of particular importance with structural quality products, since it gives such products increased resistance to breakage due to handling, etc.

Cellulose fibers, in addition to their pre-stressing effect, are advantageous, as compared with asbestos fibers, since they are much less expensive. In addition, most cellulose fibers have a much lower water-carrying capacity than do asbestos fibers, which is desirable. Further, products containing cellulose fibers have a much greater resistance to thermal shock than do similar products containing asbestos fibers. This is of particular importance with respect to the cooling portion of the curing cycle. Ordinarily, the cooling portion can take up to 40 percent of the entire curing cycle, and the resistance to thermal shock of the product determines the time required for cooling. The use of cellulose fibers in the product appreciably reduces the cooling portion and thereby shortens the overall curing cycle so that the throughput of the autoclaves can be materially increased.

It is ordinarily not desirable to use a large excess of water because it materially increases the cost of drying the product, causes segregation of the solids in the slurry, and tends to reduce the number of non-communicating cells. For practical purposes, it is ordinarily desirable to limit the weight of water to not more than 2½ times the total weight of the solids. Usually, the ratio of the weight of the water to the total weight of the solids is not less than 0.4. A typically satisfactory water content, which gives excellent casting fluidity without stratification or settling, is: weight of water equals weight of calcareous and siliceous ingredients plus 1–8 pounds of water per pound of fiber.

In general, the mix is prepared by mixing the solid raw materials with water to produce a slurry. The fiber, preferably presoaked, is then added and mixed. After the slurry is uniformly mixed, a predetermined quantity of stable, preformed foam is then introduced into the slurry, preferably by injecting into the bottom of the slurry. After final mixing, the aerated slurry is cast into molds. The fiber can be added at any stage of the mixing procedure. However, it is preferable to add the fiber before the foam is added.

Following casting into molds, the cast material is allowed to acquire a pre-set. This pre-setting allows the cast material to acquire sufficient green strength to resist expansion and possible rupture of the gas cells in the product during the initial stages of high pressure steam autoclaving. This period varies very considerably, according to the temperature of the mix, the ambient air temperature, the rate of rise of the temperature in the autoclave, the activity of the mix components, etc. It can vary from a period of only the time required for carrying out the stacking of the molds and charging of the autoclave to many hours, where the ambient air and mix temperatures are of the order of 15°–20° C. The period of pre-set is considerably reduced by employing mix temperatures of 70°–125° F. The pre-setting may be accomplished by heating the cast materials in a humid atmosphere at an elevated temperature, such as 125° F.

When the molded shape has been pre-set, it is placed in an autoclave, or other similar equipment, and is subjected to steam atmosphere to cause the reactive line and silica to react in the presence of water to form calcium silicate hydrate. As a practical matter this reaction is too slow to be economically feasible at temperatures much below 300° F. The heating is ordinarily carried out using saturated steam, in order to prevent evaporation of the water within the mix. Commonly used pressures range from 100 pounds per square inch gage (338° F.) to 200 pounds per square inch gage (388° F.), and the most suitable operating range is 140–160 pounds per square inch gage (361°–371° F.). However, the particular indurating temperatures and pressures set forth above are not in any sense critical to the production of calcium silicate hydrates since the induration may be effected at temperatures above and below those set forth.

The duration of the high pressure steam curing varies generally with the operating temperature and with the thickness of the product. Typical examples of curing cycles for the products described are as follows:

(a) For a 2 inch thick product, at 160 pounds per square inch gage full pressure:

| | Hours |
|---|---|
| (1) Time required to reach full pressure | 3 |
| (2) Time required at full pressure | 6 |
| (3) Time required for reducing pressure and cooling | 3 |

(b) For a 3 inch thick product, at 140 pounds per square inch gage full pressure:

| | Hours |
|---|---|
| (1) Time required to reach full pressure | 3 |
| (2) Time required at full pressure | 8 |
| (3) Time required for reducing pressure and cooling | 3 |

The residual free moisture in the cured product may be removed by circulating warm air therearound while the product is stored in a storage building, by accelerating drying at temperatures up to about 350° F., by vacuum drying techniques, etc.

The following examples are illustrative of the product produced by this invention:

Example I

A slurry was prepared containing 140 pounds of Portland cement, 120 pounds of ground silica, 2.5 pounds of aspen fiber (.25 pound of fiber per cubic foot of product), 1.4 pounds of sodium silicate, 196 pounds of water (including the water added later as foam). A precalculated quantity of a stable, preformed foam was injected into the mix such that 4.7 cubic feet of air was entrained, the foam having been prepared by incorporating air in a 3 percent solution of a hydrolyzed protein foaming agent having an expansion factor of 13. The mix was then cast in molds and pre-set by heating at 125° F. in a humid atmosphere for 6 hours, then autoclaved for 16 hours at 120 pounds per square inch steam pressure, and then dried. The total volume of the dried product was 9.6 cubic feet. The density of the dried product was 29.9 pounds per cubic foot, the compressive strength was 950 pounds per square inch, and the transverse strength was 120 pounds per square inch. The product was entirely satisfactory.

A mix, similar in all respects to that set forth above, except that it did not contain any fiber, was prepared, molded and indurated as set forth above. The molded product showed pronounced cracking and was unsuitable for use.

Example II

A slurry was prepared containing 120 pounds of Portland cement, 60 pounds of ground silica, 5 pounds of aspen fiber (.5 pound of fiber per cubic foot of product), 1.4 pounds of sodium silicate, and water. A precalculated quantity of a stable, preformed foam was injected into the mix such that 7.1 cubic feet of air was entrained in the mix, the foam having been prepared as set forth in Example I. The total water content was 183 pounds. The mix was pre-set, as described in Example I, and was autoclaved at 140 pounds per square inch steam pressure for 14 hours, and then dried. The total volume of the dried product was 10 cubic feet. The density of the dried product was 18.1 pounds per cubic foot, the compressive strength was 290 pounds per square inch, and the transverse strength was 80 pounds per square inch. The product was entirely satisfactory.

A second mix, similar in all respects to the first mix, except that it did not contain any fiber, was prepared, molded and indurated, as set forth above. The molded product showed pronounced cracking and was unsuitable for use.

A third mix, similar to the first mix, but containing 2.5 pounds of aspen fiber, was prepared, molded and indurated, as set forth above. The molded product was cracked, but to a much lesser extent than the product of the second mix.

In the following examples, the procedures followed were the same as in Example I. Accordingly, only the relevant data will be set forth herein.

| | Example | | | | | | |
|---|---|---|---|---|---|---|---|
| | III | IV | V | VI | VII | VIII | IX |
| Portland Cement (lbs.) | 220 | 180 | 110 | ------ | 160 | 100 | 136 |
| Hydrated Lime (lbs.) | 100 | 80 | 50 | ------ | 80 | ------ | ------ |
| Semihydraulic Burnt Lime (lbs.) | ------ | ------ | ------ | 120 | ------ | ------ | ------ |
| Ground Silica (lbs.) | 200 | 160 | 100 | 120 | 140 | 50 | 68 |
| Coarse Aggregate (lbs.) | ------ | ------ | ------ | 40 | ------ | ------ | 50 |
| Wood Fiber (lbs.) | 80 | 30 | 55 | ------ | ------ | 25 | 13.3 |
| Cane Fiber (lbs.) | ------ | ------ | ------ | 20 | ------ | ------ | ------ |
| Asbestos Fiber (lbs.) | ------ | ------ | ------ | ------ | 48 | ------ | ------ |
| Sodium Silicate (lbs.) | 6.6 | 5.0 | 3.3 | 1.6 | 4.0 | 1.0 | 1.3 |
| Water (lbs.) | 768 | 520 | 490 | 316 | 840 | 240 | 218 |
| Foam Agent | H | H | S | S | S | S | S |
| Concentration (percent) in Water | 3 | 3 | .2 | 3 | 3 | 3 | 3 |
| Expansion Factor | 13 | 13 | 13 | 9¾ | 9¾ | 9¾ | 9¾ |
| Air Injected (ft.$^3$) | 3.2 | 4.54 | 4.6 | 3.17 | 4.16 | 6.27 | 3.0 |
| Mix Temperature (° F.) | 80 | 78 | 76 | 100 | 110 | 100 | 90 |
| Indurating Pressure (lb./in.$^2$) | 200 | 120 | 220 | 140 | 125 | 140 | 140 |
| Indurating Time (hrs.) | 12 | 16 | 12 | 11 | 20 | 10 | 8 |
| Dry Density (lb./ft.$^3$) | 31.7 | 29.2 | 22.3 | 30 | 22 | 16 | 39 |
| Compressive Strength (lb./in.$^2$) | 1,285 | 963 | 520 | 980 | 370 | 300 | 1,200 |
| Transverse Strength (lb./in.$^2$) | 583 | 242 | 365 | 430 | ------ | 190 | 400 |
| Total Volume of Product (ft.$^3$) | 20 | 16.67 | 16.3 | 10 | 20.2 | 11.9 | 7½ |

H—Hydrolysed protein.
S—Stabilized alkyl napthalene sulphonate.

Although particular, preferred embodiments of the invention have been disclosed hereinabove for illustrative purposes, it will be understood that modifications or variations thereof, which do not depart from the scope of such disclosure are fully contemplated unless expressly stated to the contrary in the appended claims.

I claim:

1. The method of making a form retaining self sustaining body which comprises: mixing finely divided reactive siliceous and calcareous materials and water with substantially non-reactive fiber to form a stable slurry the fiber ranging in length between about three-tenths to two and one-half centimeters, and the water being between about .4 to not more than about 2½ times the total weight of the solids; incorporating preformed aqueous foam into the slurry; and autoclaving the slurry at above about one hundred pounds per square inch steam pressure to form a form retaining self sustaining body which in the dry state has an apparent density of about 15 to 40 pounds per cubic foot and fiber contributing to the transverse strength of the body; the proportion of fiber in the body being in the range of about one-fourth pound to five pounds per cubic foot, and the gas cells of the foam being in the form of spherical macroscopic voids constituting about 16 to about 70 percent of the volume of the body.

2. The method as specified in claim 1 wherein the siliceous and calcareous materials comprise Portland cement and silica flour, the latter having a specific surface area greater than 7000 square centimeters per gram.

3. The method as specified in claim 1 wherein the fibers are of cellulosic material.

4. The method as specified in claim 1 wherein the fibers are soaked in aqueous sodium silicate prior to mixing into the slurry.

5. The method as specified in claim 1 wherein the proportion of water to solids in the slurry is about the combined weight of siliceous and calcareous materials plus one to eight times the weight of fiber.

6. The method which comprises: soaking aspen fiber ranging in length between about three-tenths to about two and one-half centimeters and substantially free from lignin in sodium silicate solution, mixing such fiber into a slurry comprising Portland cement, silica flour and water in the ratio of about .4 to 2½ times the weight of solids, and mixing into the slurry a stable preformed aqueous foam to form a stable slurry having dispersed therethrough macroscopic spherical voids, presetting the slurry, and autoclaving the slurry at above about one hundred pounds per square inch steam pressure, to form a form retaining self sustaining body, the body having an apparent density in the dry state of about 15 to 40 pounds per cubic foot, and about 16 to 70 percent of its volume comprising macroscopic spherical voids, and a fiber density up to 5 pounds per cubic foot contributing to the transverse strength of the body.

References Cited in the file of this patent

UNITED STATES PATENTS

| | | |
|---|---|---|
| Re. 23,228 | Fraser | May 9, 1950 |
| 1,702,966 | Haggerty | Feb. 19, 1929 |
| 2,172,076 | Wolf et al. | Sept. 5, 1939 |
| 2,282,190 | Jahjah | May 5, 1942 |
| 2,456,643 | Napier | Dec. 21, 1948 |
| 2,526,066 | Croce | Oct. 17, 1950 |
| 2,547,127 | Kalousek | Apr. 3, 1951 |
| 2,699,097 | Binkley | Jan. 11, 1955 |

FOREIGN PATENTS

| | | |
|---|---|---|
| 531,469 | Great Britain | Jan. 6, 1941 |